Nov. 11, 1969    W. L. GASNER    3,477,480
STABILIZED CUTTING TIP FOR CHAIN SAW CUTTER LINK
Filed Jan. 31, 1968

INVENTOR
WILLIAM L. GASNER

BY Burns, Doane, Benedict, Swecker & Mathis

ATTORNEYS

United States Patent Office 3,477,480
Patented Nov. 11, 1969

3,477,480
STABILIZED CUTTING TIP FOR CHAIN SAW
CUTTER LINK
William L. Gasner, Gardena, Calif., assignor to McCulloch Corporation, Los Angeles, Calif., a corporation of Wisconsin
Filed Jan. 31, 1968, Ser. No. 701,936
Int. Cl. B27b 33/14, 33/02
U.S. Cl. 143—135                                    6 Claims

ABSTRACT OF THE DISCLOSURE

A cutter link including a planar base plate and a generally blocklike, carbide cutting tip. The base plate includes a wedge-shaped corner having a surface facing generally in the direction of cutting travel of the cutter link as well as generally toward the kerf edge cutting edge of the link. A wedged-shaped notch in the carbide tip snugly receives the wedge-shaped corner of the base plate so as to resist cutting forces tending to separate the tip from the base plate.

---

Figure 1:
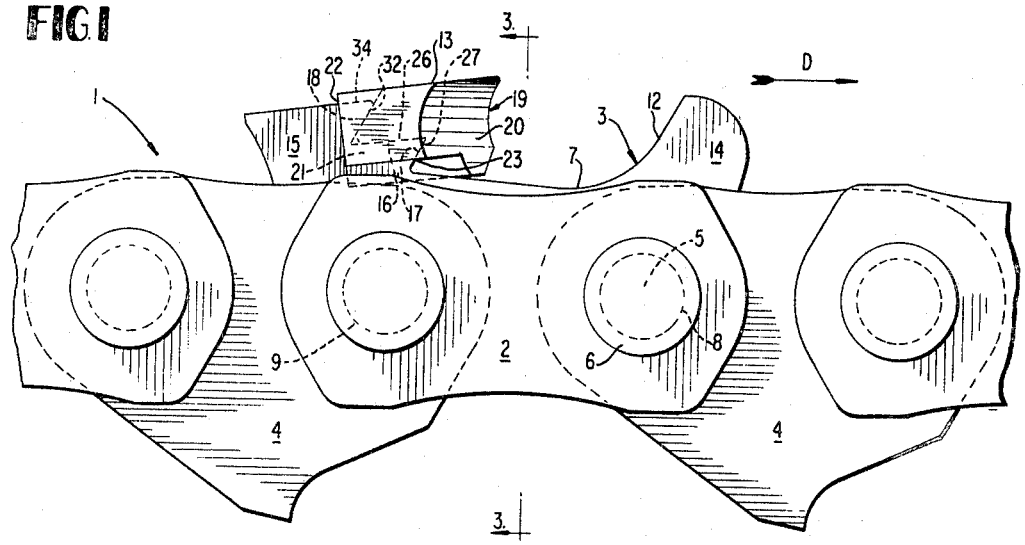

This invention relates to an improved concept for mounting a cutting tip on a sheet metal base plate of a chain saw cutter link. The concept is adapted to the mounting of carbide cutting tips.

GENERAL BACKGROUND AND OBJECTS OF THE INVENTION

For a variety of reasons it may be desirable to fabricate saw chains so that the cutter links of the saw chain are provided with wear-resistant carbide cutting tips.

A number of practitioners in the chain saw art have attempted to devise structures for mounting carbide tips on saw chain links. For example, generally saddle-shaped carbide tips, mounted on cutter links, are featured in the United States Mills Patent 2,976,900 and the United States Mall Patent 2,862,533.

In order to provide effective bonding between the Mills or Mall carbide tips and their associated base plates, it is necessary for the legs of the saddle-shaped carbide tips to be of substantial size so as to provide an adequate bonding surface between the tips and the cutter links. This, of course, increases cutter link bulk and increases the amount of carbide required to fabricate an individual cutter link tip.

Further, in structures as proposed by Mills and Mall, there is no backup support for the carbide tip in the direction of cutting travel, nor is there support immediately adjacent the cutting surface which would effectively, mechanically interlock the cutting surface with the cutting link so as to resist tendencies for the tip to be separated from the link base plate.

Other practitioners in the chain saw art have proposed structurally complex and precision-formed, T-slots as a device for securing a cutter tip to the base plate of a chain saw. One such proposal in this vein is featured in the United States Cox Patent 2,852,048. However, this T-slot structure requires a fairly high degree of precision in manufacture, along with its attendant expense, and involves a bulky cutter tip extending the entire longitudinal length of the link base plate.

It thus is an object of the present invention to provide an improved concept for mounting a cutter tip on a base plate of a chain saw cutter link so as to maintain structural simplicity, consistent with effective mechanical interlocking.

It is a further object of the invention to provide such an interlocking between a cutting tip and a base plate which effectively employs compression producing abutment means tending to concurrently intensify mechanical interlocking in response to the application of cutting forces and place portions of the tip in compression, thereby tending to increase the structural strength of interlocked portions of the tip and base plate.

It is a further object of the invention to provide an interconnection between a cutting tip and base plate of a cutter link which concurrently stabilizes the cutting tip against displacement in the cutting direction and against displacement away from the base plate of the link toward the kerf being cut by the cutter link.

SUMMARY OF OVERALL INVENTION

The overall cutter link presented through this invention includes a flat, planar base plate and a generally blocklike, kerf-cutting, carbide tip mounted on the base plate.

The base plate includes apertured wall means operable to pivotally connect the base plate to adjacent cutter links in a chain saw. Flat, planar, parallel side walls extend from the apertured wall means to the edge of the base plate which faces a kerf-engaging edge of the cutter link. A mounting surface means extends transversely between the parallel side walls, extends generally longitudinally of the cutting direction of the cutter link, and faces generally toward the kerf-engaging edge of the cutter link. A mounting abutment means extends from the mounting surface means generally away from the kerf-engaging edge and faces at least partially away therefrom.

The carbide cutting tip includes cutting surface means which extends generally transversely of the cutting direction. A slot means formed in the tip extends generally longitudinally of the cutting direction and is displaced longitudinally rearwardly of the cutting surface means with reference to the cutting direction. A supporting surface means defines a base of this slot means and faces the mounting surface means of the base plate. A locking abutment means defines an end of the slot means with the mounting abutment means being interposed between the locking abutment means and the kerf-engaging edge of the cutter link. Brazing means bond the carbide tip to the base plate.

DRAWINGS

In describing the invention reference will be made to a preferred embodiment.

In the drawings:

FIGURE 1 illustrates, in enlarged form, a portion of a chain saw cutter link assembly illustrating one carbide tip of the present invention mounted on a cutter link base plate.

Figure 2:
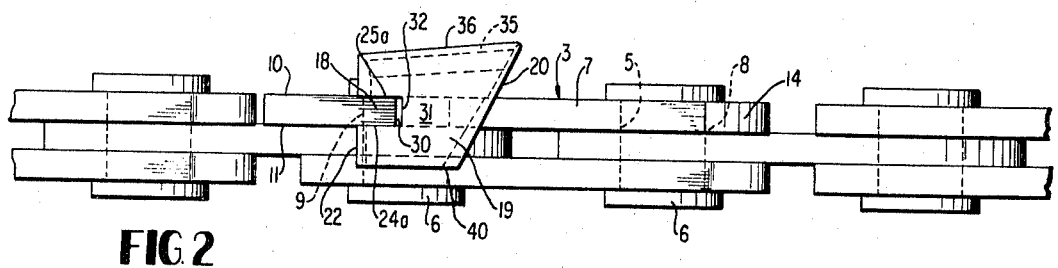

FIGURE 2 provides a top plan view of the FIGURE 1 assembly.

Figure 4:
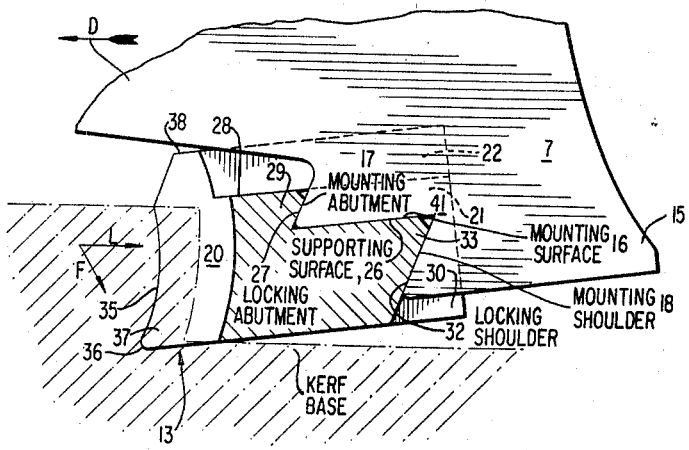
Figure 3:
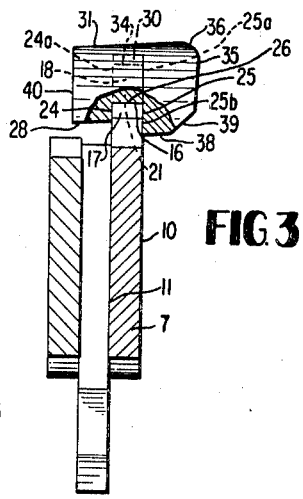

FIGURE 3 provides an elevational sectional view of the FIGURE 1 assembly as viewed along the section line 3—3 with a portion of the carbide tip being partially sectioned to reveal a carbide tip stabilizing slot which cooperates with the base plate to effectively support a carbide tip against lateral displacement tendencies; and FIGURE 4 schematically illustrates the cutter link of the FIGURE 1 assembly during a kerf-cutting operation, with the carbide tip partially sectioned in elevation, and illustrating the manner in which the mechanical interconnection between the tip and base plate effectively resists cutter-induced forces tending to separate the tip from the base plate.

MAJOR COMPONENTS OF CUTTER CHAIN ASSEMBLY

Cutter chain assembly 1, shown in FIGURE 1, includes a series of pivotally interconnected, planar, sheet metal, link components. These components comprise side links 2, cutter links 3 and spacer links 4. Each link is provided with a pair of transversely extending apertures, spaced longitudinally of the cutting direction D (direction D is schematically shown in FIGURE 1). These apertures, such as the aperture 5 at the leading end of cutter link 3, receive a pivot pin or rivet 6 which pivotally interconnects the various link components of the assembly as shown.

The basic structural arrangement of links here described is essentially the same as that set forth in the previously noted Mills and Mall patents, as well as in other representative prior art such as the United States Bullard Patent 3,292,675.

As will be understood, and as is clearly delineated in each of these prior patents, the assembly 1 will include a series of cutter links spaced longitudinally of the assembly 1, mounted on alternate sides of the assembly 1 so as to provide, so-called, left and right-handed cutter link orientation. As will be understood, each left and right-handed cutter link, if placed in side-by-side relationship, would bear a substantially mirror image relationship to each other.

These mirror image related, but longitudinally displaced, right and left-handed cutter links serve to cut away opposite sides of a kerf.

In describing the improved cutter link structure of the present invention, reference will be made only to the illustrated cutter link 3. However, it will be understood that the structure of the cutter link 3 is generally applicable to all of the cutter links in the assembly 1, bearing in mind the right and left-handed modifications of this structure.

MOUNTING PLATE

Cutter link 4 comprises a flat, planar, sheet steel base plate 7.

Sheet metal base plate 7 is provided with apertured wall portions 8 and 9, with each such portion being operable to receive a pivot pin 6. Apertured wall portion 8 serves to interconnect base plate 7 with a spacer link 4 and a side link 2. Apertured wall portion 9 serves to interconnect the trailing end of base plate 7 with side link 2 and another spacer link 4.

Base plate 7 includes a pair of flat, planar, parallel, side walls 10 and 11 extending throughout the sides of the base plate from the apertured portions to the upper compositely configured edge 12. This edge 12 faces the kerf-engaging extremity or edge 13 of the cutter link.

The peripheral configuration of sheet metal base plate 7, in its lower portion, when the link is viewed in elevation, as shown in FIGURE 1, conforms substantially to the configuration of the lower half of side link 2. The configuration of the upper half of base plate 7 is somewhat larger than the side link 2 and is illustrated in FIGURE 1.

The upper half of base plate 7 provides a conventional cutting depth gauge 14 and a carbide-tip mounting portion 15.

Mounting portion 15, as shown in FIGURES 1, 3 and 4, includes a flat mounting surface 16 extending transversely between side walls 10 and 11. Mounting surface 16 also extends generally longitudinally of the cutting direction D and faces generally toward the kerf-engaging edge 13.

A generally flat, planar, mounting abutment 17 extends from the mounting surface 16 generally away from the kerf-engaging edge 13. Mounting abutment surface 17 is inclined rearwardly relative to direction D and faces generally away from the kerf-engaging edge 13.

As will be apparent by reference to the drawings, this kerf-engaging edge is the upper portion of the link shown in FIGURE 1 (or the lower portion shown in FIGURE 4) which engages the base of a kerf being cut.

The base plate 7 also includes a generally, flat, planar, mounting shoulder surface 18 which extends from the mounting surface 16 generally toward the kerf-engaging edge 13. As shown in FIGURE 1, mounting shoulder surface 18 is inclined somewhat forwardly in the cutting direction D and faces generally toward the depth gauge 14.

CARBIDE TIP

Cutter link 3 includes a cutting tip 19 fabricated from wear-resistant material such as tungsten carbide.

Cutting tip 19 is brazed in place on mounting portion 15 of base plate 7 by conventional, industrial brazing techniques.

Carbide tip 19 is generally block-like in configuration and includes a concave or partially cylindrical cutting surface 20 extending generally transversely of the cutting direction, and inclined somewhat rearwardly thereof. A slot 21 extends longitudinally of the underside of the block 19. Slot 21 extends from, and intersects, the rear face 22 of the block 19 and terminates at a forward end 23. End 23 is spaced somewhat rearwardly of the cutting surface 20.

Slot 21 is defined by parallel side walls 24 and 25 which are disposed in brazed and surface-conforming engagement with the side walls 10 and 11 of the base plate 7. Slot 21 also includes a flat, supporting surface 26 extending perpendicular of the slot side walls 24 and 25. Supporting surface 26 thus defines a base of the slot 21. Surface 26 faces the base plate mounting surface 16 and is disposed in substantial conforming and brazed engagement with the mounting surface 16.

The leading slot end 23, with reference to the cutting direction D, is defined by a flat planar surface 27 which extends perpendicular to the slot side walls 24 and 25. This surface 27 provides a locking abutment, with the mounting abutment 17 interposed between the locking abutment 27 and the kerf-engaging edge 13 of the cutter link 3. Thus, locking abutment 27, when the cutter link 3 is viewed in elevation as shown in FIGURE 1, extends downwardly from mounting surface 26 and is inclined rearwardly of the cutting direction D.

Preferably, surfaces 17 and 27 are contiguous and disposed in surface-conforming, brazed engagement.

As will be appreciated, slot 21, which intersects the lower wall 28 of block 19, when the block is viewed as shown in FIGURES 1 and 3, is longitudinally displaced from a generally wedge-shaped residual mass of carbide material 29. This wedge-shaped mass of carbide material 29, which converges generally rearwardly of the cutting surface 20 with reference to the cutting direction D, is defined by a portion of the block base face 28 merging with the locking abutment surface 27. This mass 29 provides a hook-like structure longitudinally aligned with the cutting face 20 and with the hooking surface means facing generally rearwardly of the cutting direction.

A stabilizing slot 30 extends generally transversely of the longitudinally extending slot 21 in the carbide block or tip 19.

Stabilizing slot 30 intersects and extends upwardly from the slot 21, when the block 19 is viewed as shown in FIGURE 1. This slot 30 thus extends generally from the slot 21 toward the kerf-engaging edge 13. Slot 30 intersects rear wall 22 of the block 19 and also intersects the upper wall 31 of the carbide tip 19.

Slot 30 is defined by parallel side walls defining coplanar continuations of side walls 24 and 25. Thus the sides of slot 30 are defined by side wall 24a, defining a planar continuation of side wall 24, and side wall 25a defining a planar continuation of side wall 25. Side wall 24a and side wall 24 coact to provide a generally L-shaped side wall of planar configuration disposed in brazed and conforming engagement with one side of the mounting plate 7 adjacent the base plate surfaces 16 and 18. Side walls 25a and 25 coact in a similar fashion with the other side of plate 7.

Slot 30 also includes a flat base wall 32 extending perpendicular to and transversely of the slot side walls 24a and 25a. Slot base wall 32 extends generally upwardly from slot base wall 26 to intersect the block top surface 31. Slot base 32, as shown in FIGURE 1, is inclined upwardly from the surface 26 and generally forwardly with reference to the cutting direction D.

As will be shown, slot surfaces 26 and 32 cooperate to define a generally wedge-shaped carbide body portion 33, wedgingly received between the base plate surfaces 16 and 18.

As is also shown in FIGURE 4, the top edge 34 of base plate portion 15 terminates beneath the upper extremity of the slot 30 as defined by the carbide block top wall 31.

At this point, some mention should also be made of the remaining surfaces of the carbide tip 19. A complete description of these surfaces is set forth in a companion application of Jack W. Ehlen entitled "Improved Chain Saw Cutter Link" and filed of even date herewith.

In summary, the remaining surfaces of the block 19 comprise a kerf side cutting, i.e. facing, surface 35 and an arcuate juncture or edge 36 tangentially interconnecting the kerf side facing surface 35 and the kerf base facing surface 31. As illustrated, the planar surface 31 is inclined somewhat away from the surface 35, generally downwardly toward the apertured portions 8 and 9 of the base plate 7. Somewhat similarly, surface 35, in extending down from the curved, partially cylindrical junction 36, is inclined generally inwardly toward the base plate 7.

Surfaces 31, 35 and 20 intersect to yield a chisel-like, kerf corner, cutting, concave edge 37 carried laterally outwardly and upwardly of the base plate 7, when this base plate is viewed as shown in FIGURE 1.

On the kerf side facing side 10 of the base plate 7, the carbide tip may be extended downwardly. This downward extension may be defined by a downwardly extending side wall portion 25b and an undersurface 38 extending generally parallel to but displaced beneath the major block underface 28.

This differential in elevation of the surfaces 28 and 38 ensures sufficient clearance between the spacer link 4 and the carbide tip 19, when the spacer link 4 is pivoted relative to the links 3 during the travel of the assembly 1.

A bevel surface 39 interconnects surfaces 38 and 35 and extends generally longitudinally of the block 19. Block 19 also includes an inner, flat side wall surface 40 which interconnects and extends between block surfaces 28 and 31.

As will be appreciated, the carbide block 19 includes a generally L-shaped cutting edge comprising the linear intersection of surfaces 20 and 31, the arcuate intersection of surfaces 20 and 36, and the concave intersection of surfaces 20 and 35. The intersection of surfaces 20 and 31 performs a kerf-base cutting function. The intersection of surfaces 20 and 36 performs a kerf-corner cutting function. The intersection of surfaces 20 and 35 performs a kerf-side cutting function.

SUMMARY OF ADVANTAGES AND SCOPE OF INVENTION

FIGURE 4 schematically illustrates the manner in which the base plate 7 and carbide tip 19 cooperate to cut a kerf portion.

As there shown, the cutting action of the tip 37 produces a force F, tending to pivot the tip 19 away from the base plate 7, generally around the area 41. This tendency to separate the carbide block from the plate 7 is effectively resisted by the hook-like, wedge-shaped body, portion 29 and the cooperation between the surfaces 27 and 17.

The wedge-shaped block body portion 29, lockingly engaged with plate surface 17, is able to effectively function as a carbide tip locking mechanism, in spite of the intensive forces tending to separate this wedge zone 29 from the remainder of the carbide block 19. The normally brittle character of tungsten carbide could be expected to lead one away from the concept of using such a carbide securing portion, connected by a relatively small neck zone to the remainder of the carbide tip body, particularly where this neck zone will be subjected to various and considerable forces.

It is significant to note that the abutment shoulder 17 tends to compressively engage the wedge-shaped carbide mass 29. It is believed that this compression tendency, afforded by the abutment 17, may strengthen the hook-like portion of the block 19 so as to increase the internal strength of the block and thus increases the strength of the hook structure.

It is also believed that the provision of multiple, longitudinally and laterally displaced, compression producing abutment means, coacting between the base plate and cutting tip, tend to distribute compressive forces acting through the carbide tip, thereby improving its overall strength.

The longitudinal force vector L, acting on the block 19, presses the wedge-shaped body portions 33 into wedging and thus compressive cooperation with plate surfaces 18. This wedging action tends to maintain the carbide block 19 in compression, thereby increasing its overall strength and cutting effectiveness. The tendency of abutment 17, displaced upwardly (with reference to FIGURE 1) and longitudinally of abutment 18, to compress carbide portion 29 adjacent cutting surface 20, augments this strengthening action in the crucial cutting zone.

Lateral stability of the block 19 is uniquely improved by transversely extending the side walls 24 and 25 of the longitudinal slot 21 so as to yield L-shaped slot side walls in conforming engagement with generally L-shaped peripheral portions of the base plate 7. This L-shaped side wall configuration tends to promote multidirectional, carbide tip stability.

It is particularly significant to note that the slot and wedge, carbide tip securing arrangement effectively minimizes the bulk of the carbide tip and the areal extent to the brazed surfaces interconnecting the tip and the associated base plate.

In describing the invention, reference has been made to a preferred embodiment. However, those familiar with the chain saw art and familiar with the disclosure of this cutter link concept may well envision additional deletions, substitutions, or other modifications which would fall within the purview of the invention as defined in the appended claims.

I claim:

1. A cutter link for use in a chain saw, said cutter link comprising:
    a base plate, said base plate including
        mounting surface means extending generally longitudinally of the cutting direction of said cutter link, and facing generally toward a kerf-engaging edge of said cutter link,
        mounting abutment means extending from said mounting surface means generally away from said kerf-engaging edge and facing at least partially away therefrom; and
    a kerf cutting tip mounted on said base plate and including
        cutting surface means extending generally transversely of said cutting direction,
        slot means extending generally longitudinally of said cutting direction and displaced longitudinally rearwardly of said cutting surface means with reference to said cutting direction,
        supporting surface means defining a base of said slot means and facing said mounting surface means of said base plate, and
        locking abutment means defining an end of said slot means, with said mounting abutment means being interposed at least in part between said locking abutment means and said kerf-engaging edge of said cutter link.

2. A cutter link for use in a chain saw, said cutter link comprising:
    a flat, planar base plate, said base plate including apertured wall means operable to pivotally connect said base plate to adjacent cutter links in a chain saw, flat, planar, parallel side walls extending from said apertured wall means to the edge of said base plate facing a kerf-engaging edge of said cutter link, mounting surface means extending transversely between said parallel side walls, extending generally longitudinally of the cutting direction of said cutter link, and facing generally toward the kerf-engaging edge of said cutter link, mounting abutment means extending from said mounting surface means generally away from said kerf-engaging edge and facing at least partially away therefrom; and a carbide, kerf cutting tip mounted on said base plate and including cutting surface means extending generally transversely of said cutting direction, slot means extending generally longitudinally of said cutting direction and displaced longitudinally rearwardly of said cutting surface means with reference to said cutting direction, supporting surface means defining a base of said slot means and facing said mounting surface means of said base plate, and locking abutment means defining an end of said slot means, with said mounting abutment means being interposed between said locking abutment means and said kerf-engaging edge of said cutter link; and brazed means bonding said carbide tip to said base plate.

3. A cutter link as described in claim 2:

wherein said cutting surface means of said carbide tip is concave, with the axis of curvature thereof extending transversely of said cutting direction;

wherein said base plate includes a mounting shoulder extending from said mounting surface generally toward said kerf-engaging edge of said cutter link and inclined forwardly in said cutting direction; and wherein said carbide tip includes a locking shoulder extending from said slot means generally toward said kerf-engaging edge of said cutter link, with said mounting shoulder being interposed between said locking shoulder and said kerf-engaging edge.

4. A cutter link as described in claim 3 wherein said carbide tip includes stabilizing slot means extending transversely of said longitudinally extending slot means, extending generally toward said kerf-engaging edge of said cutter link and intersecting said longitudinally extending slot means:

said locking shoulder defining a base of said stabilizing slot means; and said longitudinally extending slot means and said stabilizing slot means including parallel side walls disposed on opposite sides of said base plate, with each of said side walls having a generally L-shaped, planar configuration extending along an edge of said mounting shoulder of said base plate and an edge of said mounting surface means of said base plate.

5. A cutter link as described in claim 4 wherein said locking abutment means is displaced rearwardly of said cutting surface means, and in general longitudinal alignment with said cutting surface means with reference to said cutting direction.

6. A cutter link as described in claim 5 wherein said carbide cutting tip includes body means extending generally from said supporting surface means and away from said kerf-engaging edge of said cutter link, said body means being generally wedge-shaped, and having a surface facing rearwardly of said cutting direction an defining said locking abutment means.

References Cited

UNITED STATES PATENTS

| | | | |
|---|---|---|---|
| 279,781 | 6/1883 | Magaw | 143—135 |
| 2,664,120 | 12/1953 | Hinkley | 143—135 |
| 2,755,828 | 7/1956 | Dunnington | 143—135 |
| 2,994,350 | 8/1961 | Lundberg | 143—135 X |

DONALD R. SCHRAM, Primary Examiner

U.S. Cl. X.R.

29—95; 143—145